United States Patent [19]

Schramm et al.

[11] Patent Number: 5,043,132

[45] Date of Patent: Aug. 27, 1991

[54] APPARATUS FOR TRANSPORTING AND INVERTING CORE FRAME PARTS OF A NUCLEAR REACTOR

[75] Inventors: Herbert Schramm, Hoechstadt/Aisch; Gerhard Landrock, Baiersdorf; Juergen Tautz, Hemhofen, all of Fed. Rep. of Germany

[73] Assignee: Siemens Aktiengesellschaft, Munich, Fed. Rep. of Germany

[21] Appl. No.: 389,120

[22] Filed: Aug. 3, 1989

[30] Foreign Application Priority Data

Aug. 3, 1988 [DE] Fed. Rep. of Germany ....... 3826401

[51] Int. Cl.[5] ............................................. G21C 19/00
[52] U.S. Cl. ................................... 376/260; 414/421; 414/758
[58] Field of Search ....................... 376/260, 261, 262; 414/421, 758

[56] References Cited

U.S. PATENT DOCUMENTS

| | | | |
|---|---|---|---|
| 710,894 | 10/1902 | Robinson | 414/758 |
| 3,478,907 | 11/1969 | Dechantsreiter | 414/421 |
| 4,523,670 | 6/1985 | Yanagisawa et al. | 414/758 |
| 4,708,571 | 11/1987 | Sappok | 376/260 |

*Primary Examiner*—Daniel D. Wasil
*Attorney, Agent, or Firm*—Herbert L. Lerner; Laurence A. Greenberg

[57] ABSTRACT

An apparatus for transporting and inverting core frame parts of a nuclear reactor includes a cross beam. A horizontal shaft is supported on the cross beam. A flexion and torsion-resistant basket is disposed below the cross beam for receiving a core frame part. A bearing pivotably supports the basket on the horizontal shaft. Pulleys are attached to opposite sides of the basket at right angles relative to the shaft. Positioning drives are seated at the cross beam and deflection rollers are adjustably attached to the positioning drives. Flexible tension members each lead from a respective one of the pulleys to a respective one of the positioning drives and to a respective one of the deflection rollers. The tension members are prestressed relative to the bearing for the basket.

16 Claims, 4 Drawing Sheets

APPARATUS FOR TRANSPORTING AND INVERTING CORE FRAME PARTS OF A NUCLEAR REACTOR

The invention relates to an apparatus for transporting and inverting core frame parts or internals of a nuclear reactor.

Such an apparatus is needed to provide access to the grid or lattice plate located on the underside of the core frame, such as, for instance, to permit repairs or inspections to be made on the underside of the upper core frame of a pressurized water reactor. In order to provide radiation protection, this inversion process must be carried out underwater with a sufficient depth of covering water in the storage or reactor well of the reactor building. The process must take into account the fact that the upper core frame has a complicated structure, which has to meet stringent demands for dimensional accuracy both for reasons of safety and geometry. The total weight including the control rod guide inserts is between 35 and 45 tons. The dimensions are approximately 4 to 5 meters in diameter and 3 to 4 meters in height. Prior art devices have not fulfilled all of these needs.

It is accordingly an object of the invention to provide an apparatus for transporting and inverting core frame parts or internals of a nuclear reactor, which overcomes the hereinafore-mentioned disadvantages of the heretofore-known devices of this general type.

With the foregoing and other objects in view there is provided, in accordance with the invention, an apparatus for transporting and inverting core frame parts of a nuclear reactor, comprising a cross beam above the frame part, a horizontal shaft supported on the cross beam, a flexion and torsion-resistant basket disposed below the cross beam for receiving a core frame part, a bearing pivotably supporting the basket on the horizontal shaft, pulleys attached to opposite sides of the basket at right angles relative to the shaft, positioning drives seated at the cross beam, deflection rollers adjustably attached to the positioning drives, flexible tension members each leading from a respective one of the pulleys to a respective one of the positioning drives and to a respective one of the deflection rollers, and means for prestressing the tension members relative to the bearing for the basket.

With the apparatus according to the invention, it is assured that the upper core frame or similar structural parts will not undergo any excessive strains, shifting or deformation when being inverted. The entire system remains stable regardless of the location of the center of gravity, because any slight torque that can arise from inaccurate detection of the center of gravity is compensated for or absorbed as a result of the prestressed closed system of tension members. Thus, in the suspended state, a stable position in which the flexion and torsion-resistant basket absorbs all of the strains is secured.

In accordance with another feature of the invention, the bearing includes two rigid brackets extending from opposite sides of the basket to the cross beam. The weight of the core components and the basket is supported with these brackets.

In accordance with still another feature of the invention, the bearing includes two rigid brackets extending from opposite sides of the basket to the cross beam.

In accordance with a further feature of the invention, the horizontal shaft has shaft journals attached to the basket, and the brackets have recesses formed therein fitting over the shaft journals. In this way, the abutment of the basket on the cross beam can be attained by a simple, short lateral motion.

In accordance with an added feature of the invention, advantageously the brackets are pivotably secured on the cross beam for this purpose.

In accordance with an additional feature of the invention, the tension elements are closed cable loops secured to the pulleys and to the positioning drives. The prestressing is brought to bear by these closed cable loops.

In accordance with still an additional feature of the invention, the deflection rollers are vertically adjustable. For this purpose, the deflection roller is advantageously adjustably disposed, for instance with a spindle, with which the vertical position of the shaft of the deflection roller is varied.

The positioning drives serve to pivot the basket with the aid of the pulleys secured thereto. In accordance with yet another feature of the invention, the positioning drives include hydraulically actuated pistons having piston rods, the cable loops being guided through the piston rods.

In accordance with yet a further feature of the invention, the piston rods each have a longitudinal bore formed therein through which a respective one of the cable loops extend, so that a closed force system having a defined position is created.

In accordance with yet an added feature of the invention, the tension members have strain gauges for monitoring the prestressing and the forces during the inversion process. With such strain gauges, the inversion process itself can be monitored as well, as will be described in further detail below.

In accordance with yet an additional feature of the invention, the basket includes two profile steel rings and a plurality of supports interconnecting the rings, because in this way the necessary flexional and torsional resistance can be attained with relatively low weight.

In accordance with again another feature of the invention, the basket includes two screwed-together segments. This is done with a view to transporting the basket.

In accordance with again a further feature of the invention, the basket has a plurality of feet to be attached by remote control and grid or lattice plate bracing means that are attachable and detachable by remote control and are detached in the inverted state, thereby facilitating access to the core frame parts located in the basket.

In accordance with again an added feature of the invention, the tension elements and the positioning drives are interconnected at a coupling point, and the cross beam includes means for providing access by personnel in the vicinity of the coupling point. This facilitates the assembly, and in particular the abutment of the tension members and any adjustment that might become necessary.

In accordance with again an additional feature of the invention, there are provided wedges adjustably disposed between the core frame parts and the basket for laterally locking the core frame parts in place.

In accordance with still another feature of the invention, there are provided adjustable levers laterally locking the core frame parts to the basket.

In accordance with a concomitant feature of the invention, the levers have ends facing toward the core frame parts, and there are provided adjustable pressure pieces disposed on the ends of the levers.

Other features which are considered as characteristic for the invention are set forth in the appended claims.

Although the invention is illustrated and described herein as embodied in an apparatus for transporting and inverting core frame parts of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
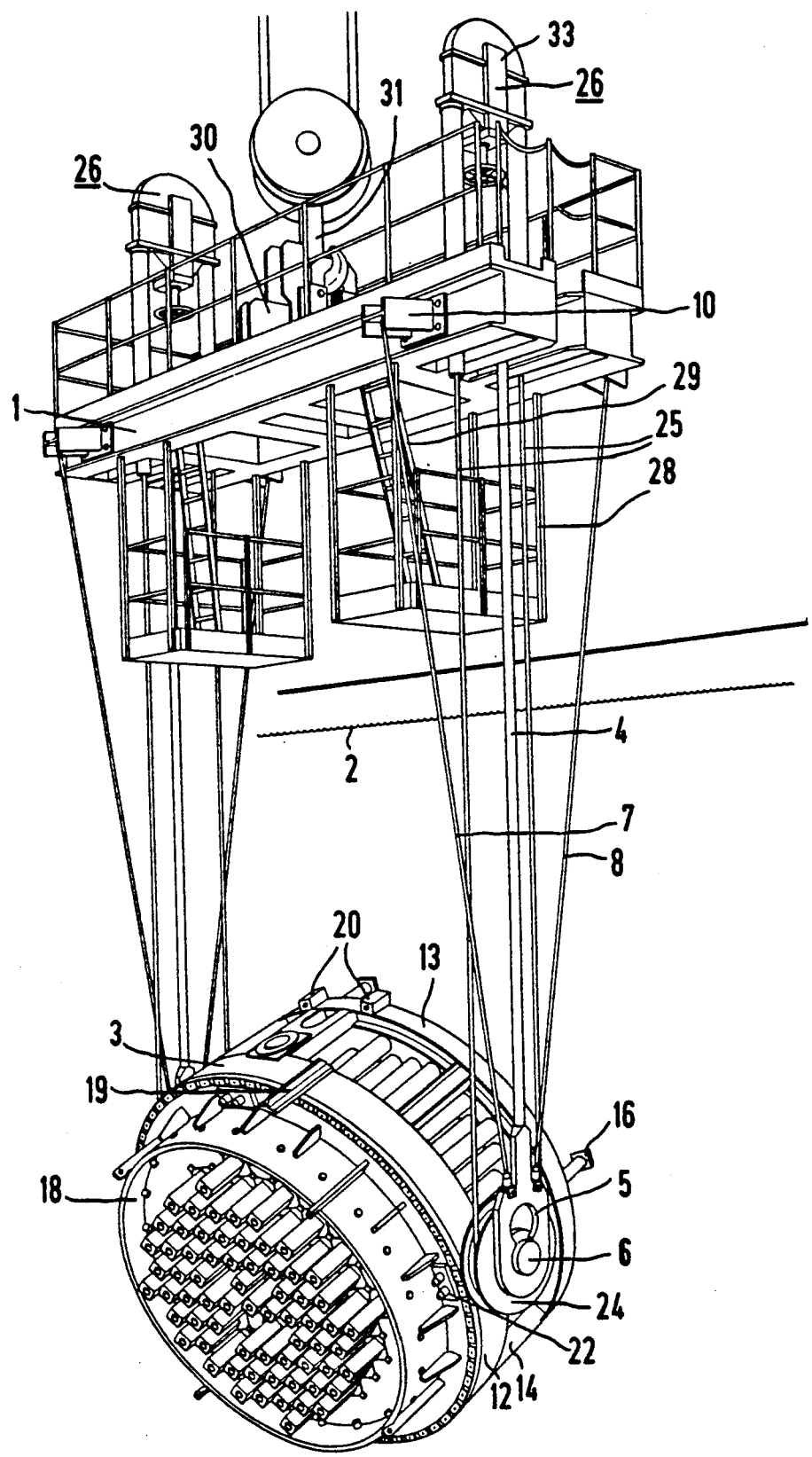
FIG. 1 is a fragmentary, diagrammatic, perspective view of an inverting apparatus for the upper core frame of a pressurized water reactor.

Referring now to the figures of the drawing in detail and first, particularly, to FIG. 1 thereof, it is seen that the essential parts included in the apparatus according to the invention are a cross beam 1 and an invertible basket 3 which is located below it and below the surface 2 of the water. The invertible basket 3 is suspended from two rigid hoisting brackets 4, which have recesses 5 formed therein that fit over shaft journals 6 forming a horizontal shaft on opposite sides of the invertible basket 3 defining bearings therebetween. The hoisting brackets 4 of the bearings have a length of approximately 8 meters. They are each fixed with two guy cables 7 and 8, which lead to guide bearings 10 on both sides of the cross beam 1.

The invertible basket 3 is formed of two parallel steel rings 12 and 13, which have a circular profile and are joined at least at four points about the periphery thereof by intervening supports 14. The two rings 12 and 13 are split, resulting in two ring segments which are easier to transport. The lower ring 13 also has four feet 16 and four grid or lattice plate bracing means 20, which are disposed in pairs in the vicinity of two opposed feet 16.

Figure 3:
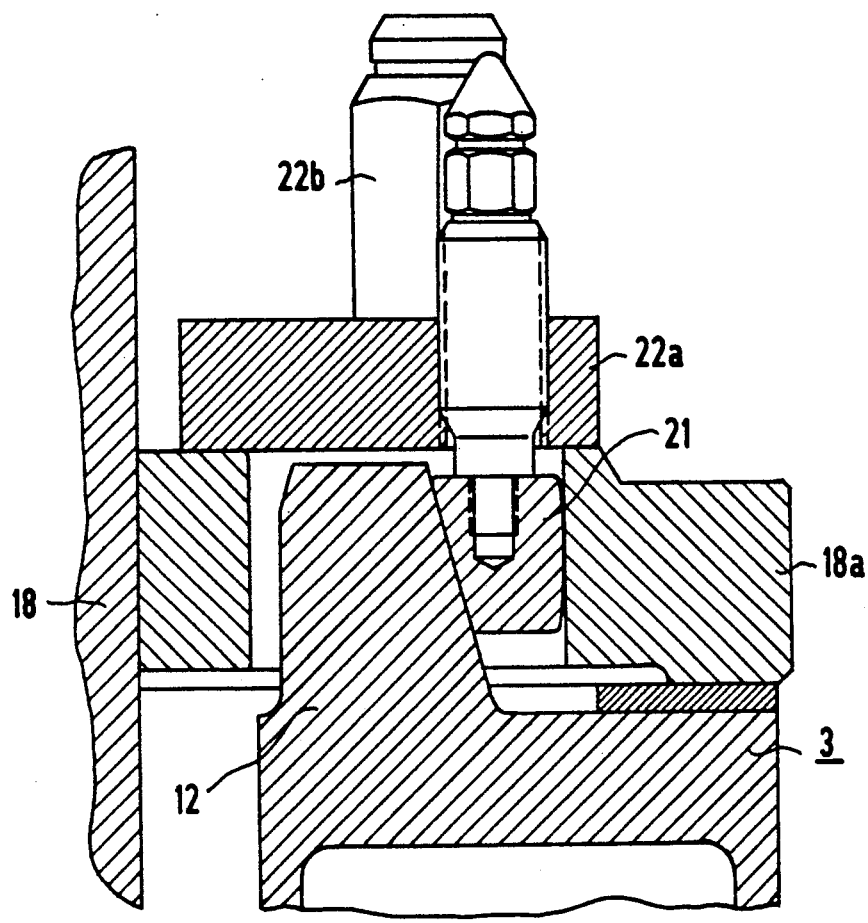
FIG. 3 is a further enlarged, fragmentary, sectional view of a lateral fixation of the core frame in the invertible basket with the aid of wedges at one end of the invertible basket.

An upper core frame, which is identified as a whole by reference numeral 18, is seated in the interior of the invertible basket 3. The frame is guided in the basket 3 with centering rods 19. As FIG. 3 shows, a flange 18a of the core frame 18 is form-lockingly fixed in the lateral direction with respect to the ring 12 by an adjustable wedge 21. A form-locking connection is one which connects two elements together due to the shape of the elements themselves, as opposed to a force-locking connection, which locks the elements together by force external to the elements. This is true for both fastening points located at right angles to the axis of inversion. At these and at the other two fastening points, the flange 18a is firmly clamped with cover plates 22a and screws 22b.

Figure 4:
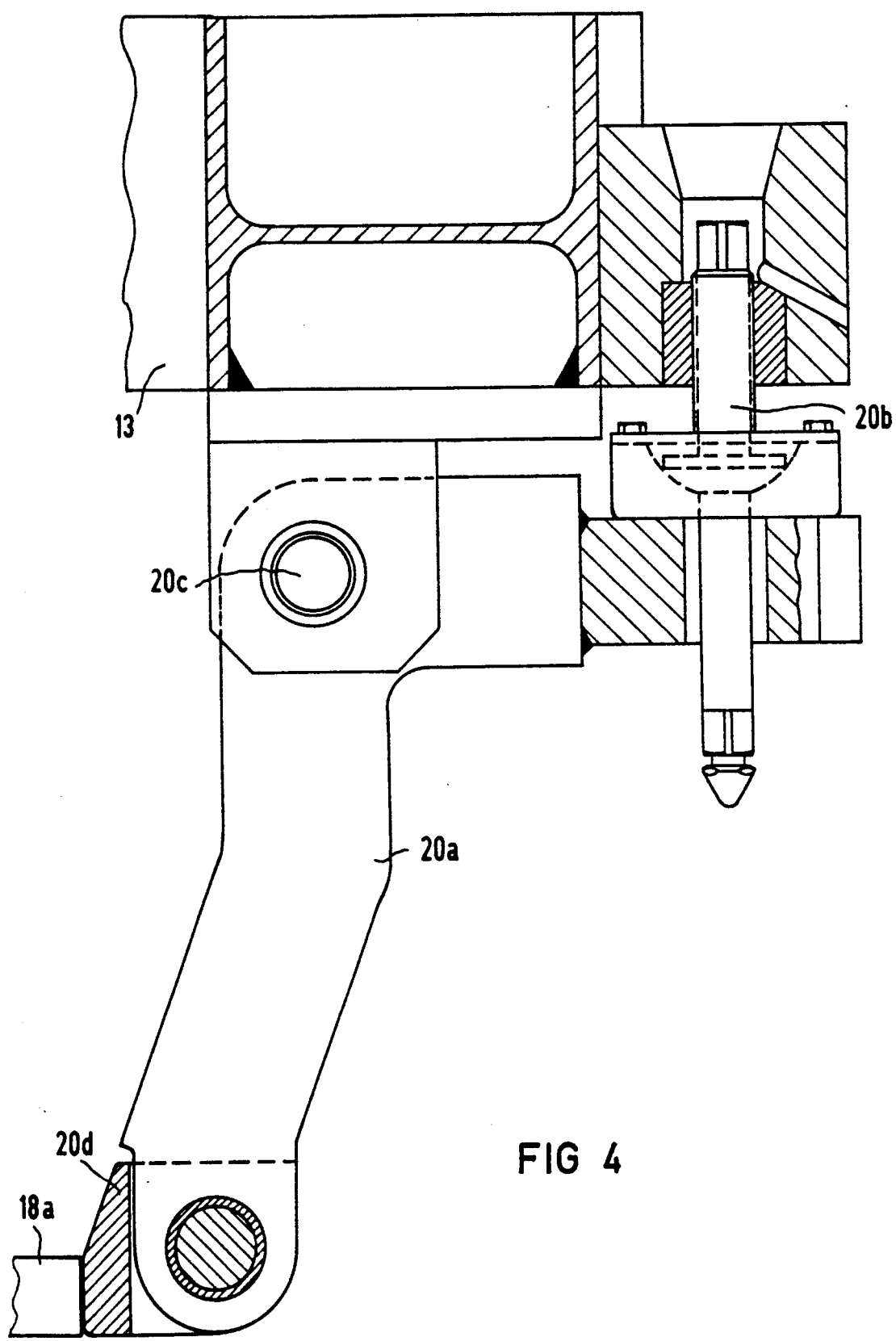
FIG. 4 is a fragmentary, sectional view of a lateral fixation at the other end of the core frame with a bell crank.

On the other ring 13, the four grid or lattice plate bracing means 20 are attached at right angles to the axis of rotation. FIG. 4 shows that the bracing means 20 include a bell crank 20a, which can be pivoted with a screw 20b about a shaft 20c. This pivoting permits a pressure piece 20d adjustably supported at the free end of the bell crank 20a to form-lockingly press against the outside of the grid plate 18a.

Inversion pulleys 24 are firmly attached to opposite sides of the invertible basket 3 in the vicinity of the shaft journals 6. Tension means in the form of steel cables 25 extend from these pulleys and lead from the pulleys 24 upward to the cross beam 1. Two identical deflecting and cable tensioning devices 26 which are provided at the cross beam, will be described in further detail below.

Two cages 28, which are accessible by ladders 29 from the top of the cross beam, are attached to the underside of the cross beam 1. From the cages 28, the steel cables 25 can be attached to the deflection and cable tensioning device 26 in the region where they are coupled. Suspension means 30 which are provided between the devices 26 in the middle of the cross beam 1, can be engaged by the crane hook 31 of the circulating crane that is already present in a nuclear power plant. Thus the apparatus is symmetrically constructed as a whole.

Figure 2:
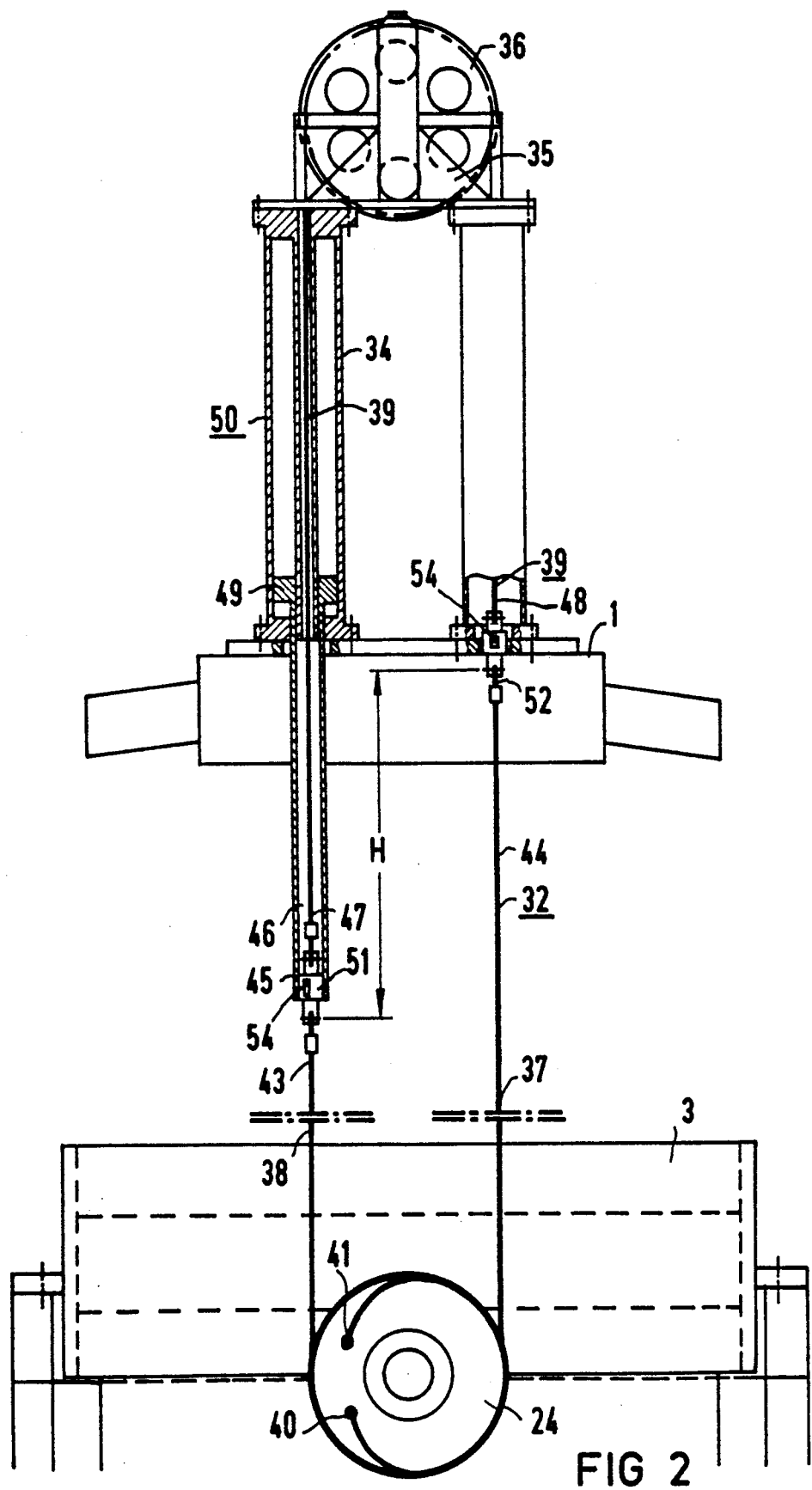
FIG. 2 is an enlarged side-elevational view of an invertible basket with tension members and devices for attaining an initial stress.

FIG. 2 shows the deflection and cable tensioning devices 26 after the removal of a cover hood 33 shown in FIG. 1. It can be seen that a bearing block 35 for a deflecting roller 36 is secured on the cross beam 1 through two hollow-cylindrical supports 34. The upper end of a cable loop 32, which is formed of three segments 37, 38 and 39, travels over the deflecting roller 36. One end of each of the two segments 37 38 is each attached to the inverting or inversion pulley 24. Specifically, the end of the cable segment 37 is secured at a fastening point 40 and the end of the cable segment 38 is secured at a fastening point 41. A free end 43 of the segment 38 is secured to the underside of a piston rod 45. The piston rod 45 is hollow, as FIG. 2 shows.

The third cable segment 39 has an end 47 which is secured in the interior 46 of the piston rod 45 and it is guided over the deflecting roller 36. The other end 48 of the cable segment 39 is coupled to the end 44 of the cable 37, making a closed cable loop 32.

The piston rod 45 leads to a hydraulic piston 49 of a positioning drive or drive means 50, for which the tube 34 forms the associated cylinder. Thus the cable segment 37 can be hydraulically adjusted by projection of the piston 49, and the cable segment 38 can be hydraulically adjusted by retracting the piston 49, through a stroke H shown in FIG. 2 of approximately 1.65 meters. With this motion, the pulleys 24 on both sides of the invertible basket 3 are rotated, so that a pivoting about an angle of 180° can be effected.

With the apparatus according to the invention, the operation proceeds as follows:

The upper core frame 18 is inserted, screwed and braced into the flexion and torsion-resistant basket 3. The two inversion pulleys 24 and the two short shaft journals 6, through which the entire unit is rotatably supported, are attached to the basket at two opposite points approximately at the overall center of gravity of the upper core frame 18 and invertible basket 3 taken together.

The cable loop 32 secured to the pulleys 24 in a form-locking manner and is prestressed accordingly by
a) retraction of the piston rod 45 of the hydraulic cylinder 34 and
b) a vertical motion of the deflection roller 36.

In order to monitor the initial stress and the cable forces resulting from the inversion process, the connecting elements 51 and 52 of the cables 37, 38, 39 are equipped with strain gauges 54. The prestressing forces can be displayed and the cable forces in the inversion process can be plotted and monitored continuously with non-illustrated digital strain measuring instruments and a connected recorder unit. Conclusions can be drawn as to whether or not the center of gravity is off center, as to the frictional forces in the axes of rotation of the recesses 5 and the shaft journals 6 and as to safety, from the computed breaking force of the inversion cable segments 37, 38, 39. Rotational motion of the unit is performed by further retraction or projection of the piston rod 45. If the situation is such that the axis of rotation of the shaft journals 6 and the center of gravity are not identical, then the only result of this can be that one cable 37 is loaded in addition to the prestressing, while the other cable 38 is relieved. Nevertheless, the entire system remains stable at a suitably selected initial stress.

The reliable spacing apart of the center of gravity with respect to the axis of rotation of the shaft journals 6 can be dictated by a suitable selection of the diameter of the pulleys 24, the diameter of the cable segments 37, 38, 39, and the construction of the positioning drive means 50.

The reaction force of the linear force (required for the inversion) of the cylinder 34 would tilt the cross beam 1, and especially with the piston rod 45 projected this would cause undesirable shear forces on the piston rod 45. Suitably prestressed guying cables 7, 8 are therefore disposed between pivot bearings formed of the recesses 5 and the shaft journals 6 and the cross beam 1, in order to prevent such tilting.

The foregoing is a description corresponding in substance to German Application P 38 26 401.3, dated Aug. 3, 1988, the International priority of which is being claimed for the instant application, and which is hereby made part of this application. Any material discrepancies -between the foregoing specification and the aforementioned corresponding German application ar to be resolved in favor of the latter.

We claim:

1. Apparatus for transporting and inverting core frame parts of a nuclear reactor, comprising a cross beam, a horizontal shaft supported on said cross beam, a flexion and torsion-resistant basket disposed below said cross beam for receiving a core frame part, a bearing pivotably supporting said basket on said horizontal shaft, pulleys attached to opposite sides of said basket at right angles relative to said shaft, positioning drives seated at said cross beam, deflection rollers adjustably attached to said positioning drives, flexible tension members each leading from a respective one of said pulleys to a respective one of said positioning drives and to a respective one of said deflection rollers, and means for prestressing said tension members relative to said bearing for said basket, said bearing including two rigid brackets extending from opposite sides of said basket to said cross beam for supporting said basket.

2. Apparatus according to claim 1, including wedges adjustably disposed between the core frame parts and said basket for laterally locking the core frame parts in place.

3. Apparatus according to claim 1, including cables laterally guying the brackets.

4. Apparatus according to claim 1, wherein said horizontal shaft has shaft journals attached to said basket, and said brackets have recesses formed therein fitting over said shaft journals.

5. Apparatus according to claim 1, wherein said brackets are pivotably secured on said cross beam.

6. Apparatus according to claim 1, wherein said tension elements are closed cable loops secured to said pulleys and to said positioning drives.

7. Apparatus according to claim 6, wherein said positioning drives include hydraulically actuated pistons having piston rods, said cable loops being guided through said piston rods.

8. Apparatus according to claim 7, wherein said piston rods each have a longitudinal bore formed therein through which a respective one of said cable loops extend.

9. Apparatus according to claim 1, wherein said deflection rollers are vertically adjustable.

10. Apparatus according to claim 1, wherein said tension members have strain gauges for monitoring the prestressing.

11. Apparatus according to claim 1, wherein said basket includes two profile steel rings and a plurality of supports interconnecting said rings.

12. Apparatus according to claim 11, wherein said basket includes two screwed-together segments.

13. Apparatus according to claim 11, wherein said basket has a plurality of feet to be attached by remote control.

14. Apparatus according to claim 1, wherein said tension elements and said positioning drives are interconnected at a coupling point, and said cross beam includes means for providing access by personnel in the vicinity of said coupling point.

15. Apparatus according to claim 1, including adjustable levers laterally locking the core frame parts to said basket.

16. Apparatus according to claim 15, wherein said levers have ends facing toward the core frame parts, and including adjustable pressure pieces disposed on said ends of said levers.

* * * * *